(12) United States Patent
Lee et al.

(10) Patent No.: US 8,228,812 B2
(45) Date of Patent: Jul. 24, 2012

(54) METHOD AND SYSTEM FOR PROVIDING MULTICAST SERVICE IN NEXT-GENERATION NETWORK

(75) Inventors: Hyun Jin Lee, Daejeon (KR); Hwa Suk Kim, Daejeon (KR); Kee Seong Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 585 days.

(21) Appl. No.: 12/333,662

(22) Filed: Dec. 12, 2008

(65) Prior Publication Data

US 2010/0150047 A1  Jun. 17, 2010

(51) Int. Cl.
*G01R 31/08* (2006.01)
(52) U.S. Cl. .................................................... 370/252
(58) Field of Classification Search .............. 370/321, 370/312, 390, 229, 248, 252, 254, 235, 351, 370/389, 230
See application file for complete search history.

(56) References Cited

U.S. PATENT DOCUMENTS 7,725,915 B2 * 5/2010 Kang ............................. 725/120
7,808,993 B2 * 10/2010 Zwiebel et al. ............... 370/392
2002/0091810 A1   7/2002 Hundscheidt et al.
2007/0147374 A1 * 6/2007 Lee et al. ...................... 370/390
2009/0187951 A1 * 7/2009 McCarthy et al. .............. 725/58

FOREIGN PATENT DOCUMENTS

KR    10-2005-0043176 A    5/2005
KR    10-2006-0034579 A    4/2006
KR    10-2006-0066444 A    6/2006

OTHER PUBLICATIONS

Office Action dated May 27, 2009, in corresponding Korean Patent Application No. 10-2007-0093206.

* cited by examiner

*Primary Examiner* — Andrew Lai
*Assistant Examiner* — Anh Ngoc Nguyen
(74) *Attorney, Agent, or Firm* — NSIP Law

(57) ABSTRACT

Provided are a method and system for providing a multicast service in a next-generation network (NGN), which can improve the quality-of-service (QoS) of broadcast services by separating a routing path calculation function and a resource allocation function during the setting of a multicast broadcast channel and enabling a resource control server to perform centralized resource control. In the method and system for providing a multicast service in an NGN, a multicast router calculates a routing path, and a number of multicast routers on the calculated routing path issue a request for resources for a desired multimedia broadcast channel, and a resource control server allocates resources to the multicast routers on the calculated routing path.

15 Claims, 4 Drawing Sheets

METHOD AND SYSTEM FOR PROVIDING MULTICAST SERVICE IN NEXT-GENERATION NETWORK

BACKGROUND OF THE INVENTION

1. Field of the Invention

The present invention relates to a method and system for providing a multicast service in a next-generation network (NGN), which can improve the quality-of-service (QoS) of broadcast services by separating a routing path calculation function and a resource allocation function during the setting of a multicast broadcast channel and performing centralized resource control.

The present invention was partly supported by the IT R&D program of Ministry of Information and Communication (MIC) and Institute for Information Technology Advancement (IITA) [Project No.: 2006-S-058-02, Project Title: Development of Network/Service Control Technology in All IP-based Convergence Network]

2. Description of the Related Art

A next-generation network (NGN) is a voice/data converged network, which is created by incorporating nearly all types of communication networks such as a typical telephone network and a wireless communication network into a packet-based common network and can thus reduce the cost of the establishment and management of a network and provide various flexible and versatile network solutions and applications.

In order to receive a multimedia broadcast program from an NGN, a terminal such as a set-top box may be provided with electronic program guide (EPG) information by a broadcast control server, and a user may choose one of a plurality of broadcast channels with reference to the EPG information. Once the user chooses a broadcast channel, the terminal may issue a request for joining a multicast group by using a multicast group identifier (ID) allocated to the chosen broadcast channel. According to a typical multicast protocol, a routing protocol in a multicast router begins to be executed upon receiving a request for joining a multicast group from a user. Thus, a routing path is calculated, and at the same time, a path is set. Then, multicast traffic is transmitted.

However, a multicast router may not be able to determine the resource state of a whole network and may thus have to calculate a routing path based on the resource state of each individual router. In addition, since there is no network equipment responsible for the allocation of resources, it is almost impossible to guarantee an effective allocation of network resources.

SUMMARY OF THE INVENTION

The present invention provides a method and system for providing a multicast service in a next-generation network (NGN), which can improve the Quality-of-Service (QoS) of broadcast services by performing centralized resource control.

According to an aspect of the present invention, there is provided a method of providing a multicast service, the method comprising calculating a first routing path between a first multicast router and a rendezvous point multicast router, the first multicast router being disposed at a transmitter-side network termination, enabling a resource control server to receive a request for resources from a number of routers on the first routing path and to allocate resources to the routers on the first routing path, enabling a terminal that is allowed to use resources for a desired broadcast channel to issue a request for joining a multicast group and calculating a second routing path between a second multicast router and the rendezvous point multicast router, the second multicast router being disposed at a terminal-side network termination, and enabling the resource control server to receive a request for resources from a number of routers on the second routing path and to allocate resources to the routers on the second routing path.

According to another aspect of the present invention, there is provided a system for providing a multicast service, the system comprising at least one transmitter-side multicast router configured to be disposed at a transmitter-side network termination and to issue a request for the calculation of a first routing path to a rendezvous point multicast router, a terminal configured to issue a request for a desired broadcast channel, to receive a broadcast program from the desired broadcast channel and to reproduce the broadcast program, at least one terminal-side multicast router configured to be disposed at a terminal-side network termination and to calculate a second routing path to the rendezvous point multicast router, a resource control server configured to receive a request for resources from a number of routers on the first routing path and a number of routers one the second routing path and to allocate resources to the routers on the first routing path and the routers on the second routing path, and a broadcast control server configured to issue a request for permission to use resources to the resource control server upon receiving the request issued by the terminal and to notify the terminal whether the resource control server is to grant permission to use resources.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

A method and system for providing a multicast service according to the present invention may be applied to a session initiation protocol (SIP)-based next-generation network (NGN) environment, but the present invention is not restricted to this. That is, the present invention may also be applied to other network environments that satisfy a set of conditions.

Figure 1:
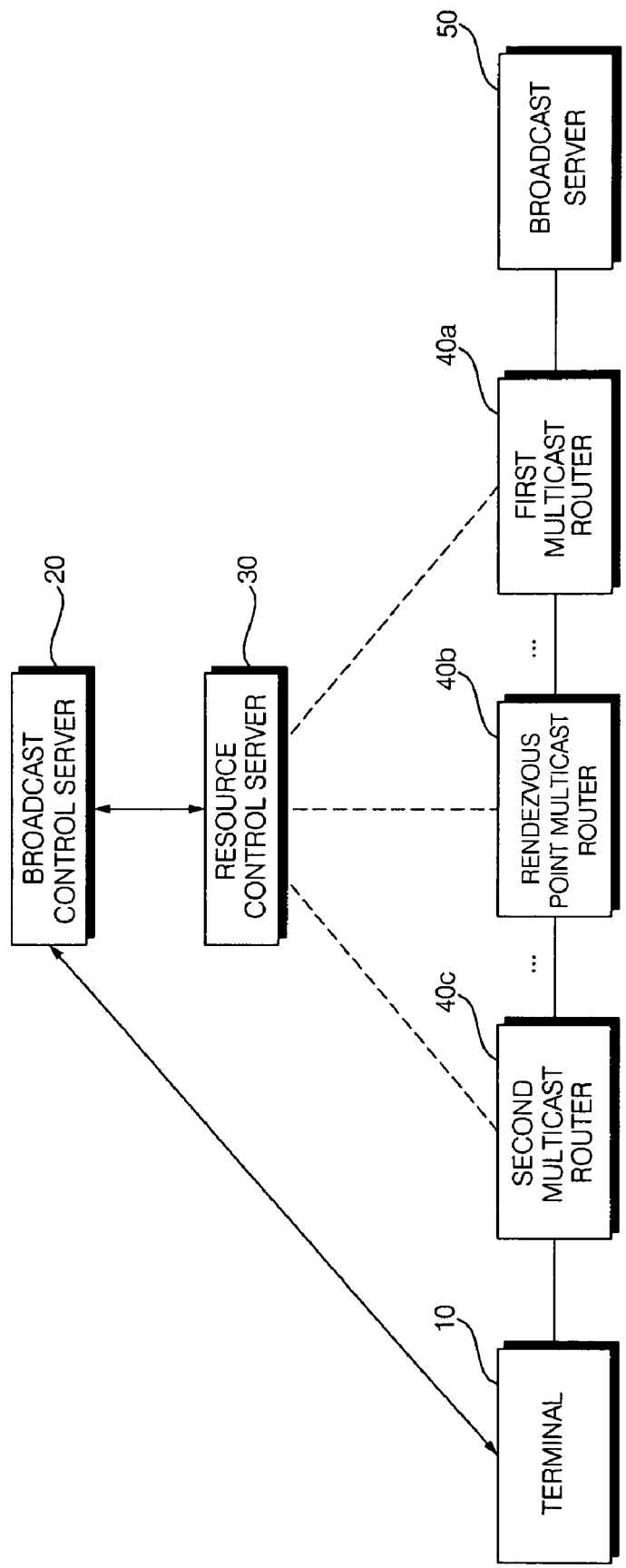
FIG. 1 illustrates a block diagram of a system for providing a multicast service according to an embodiment of the present invention.

FIG. 1 illustrates a block diagram of a system for providing a multicast service according to an embodiment of the present invention. Referring to FIG. 1, the system includes a terminal 10, a broadcast control server 20, a resource control server 30, a first multicast router 40a, a rendezvous point multicast router 40b, a second multicast router 40c and a broadcast server 50. The system is illustrated in FIG. 1 as having only three multicast routers, but the present invention is not restricted to this. That is, the system may include more than three multicast routers on the routing paths.

The terminal 10 is a device such as a set-top box which requests the setting of a multimedia broadcast service channel and receives a multimedia broadcast program once a multimedia broadcast service channel is set. The broadcast control server 20 controls multimedia broadcast services. The broadcast control server 20 transmits electronic program guide (EPG) information to the terminal 10. When the terminal 10 requests a broadcast channel, the broadcast control server 20 issues a request for permission to use resources to the resource control server 30 and is notified whether the resource control server 30 is to grant permission to use resources. The broadcast control server 20 and the resource control server 30 may communicate with each other using an Rx or Gq protocol, on which research has recently been conducted in connection with NGN technology.

The resource control server 30 responds to the request issued by the broadcast control server 20 for permission to use resources, and receives a request for resources from a number of routers on a routing path calculated by the multicast routers 40a, 40b and 40c and allocates resources to the routers on the calculated routing path. Then, the resource control server 30 notifies the broadcast control server 20 of the results of the allocation of resources. The multicast routers 40a, 40b, and 40c may communicate using a common open policy service (COPS) protocol.

The COPS protocol is a transmission control protocol (TCP)-based query-and-response protocol, which is used for a policy decision point (PDP) and a policy enforcement point (PEP) to exchange policy information. A PEP may be a router or a device that handles IP traffic, and may be configured to implement a policy set by a PDP. A PDP may be a controller that grants permission to access a network to a client or provides services to a client. That is, the COPS protocol may adopt a client/server model in which a PEP transmits a request, update, and delete request to a PDP and a PDP notifies a PEP of its decisions.

The multicast routers 40a, 40b and 40c may be equipped with a multicast routing protocol for calculating a multicast path such as a protocol independent multicast-sparse mode (PIM-SM) protocol. The PIM-SM protocol is a protocol that configures a multicast forwarding tree based on unicast routing information. Due to the properties of the PIM-SM protocol, a broadcast program provided by the broadcast server 50 may be transmitted to the rendezvous point multicast router 40b, and a multicast tree between the rendezvous point multicast router 40b and the second multicast router 40c, which is disposed at a network termination near the terminal 10, may be configured.

Figure 2:
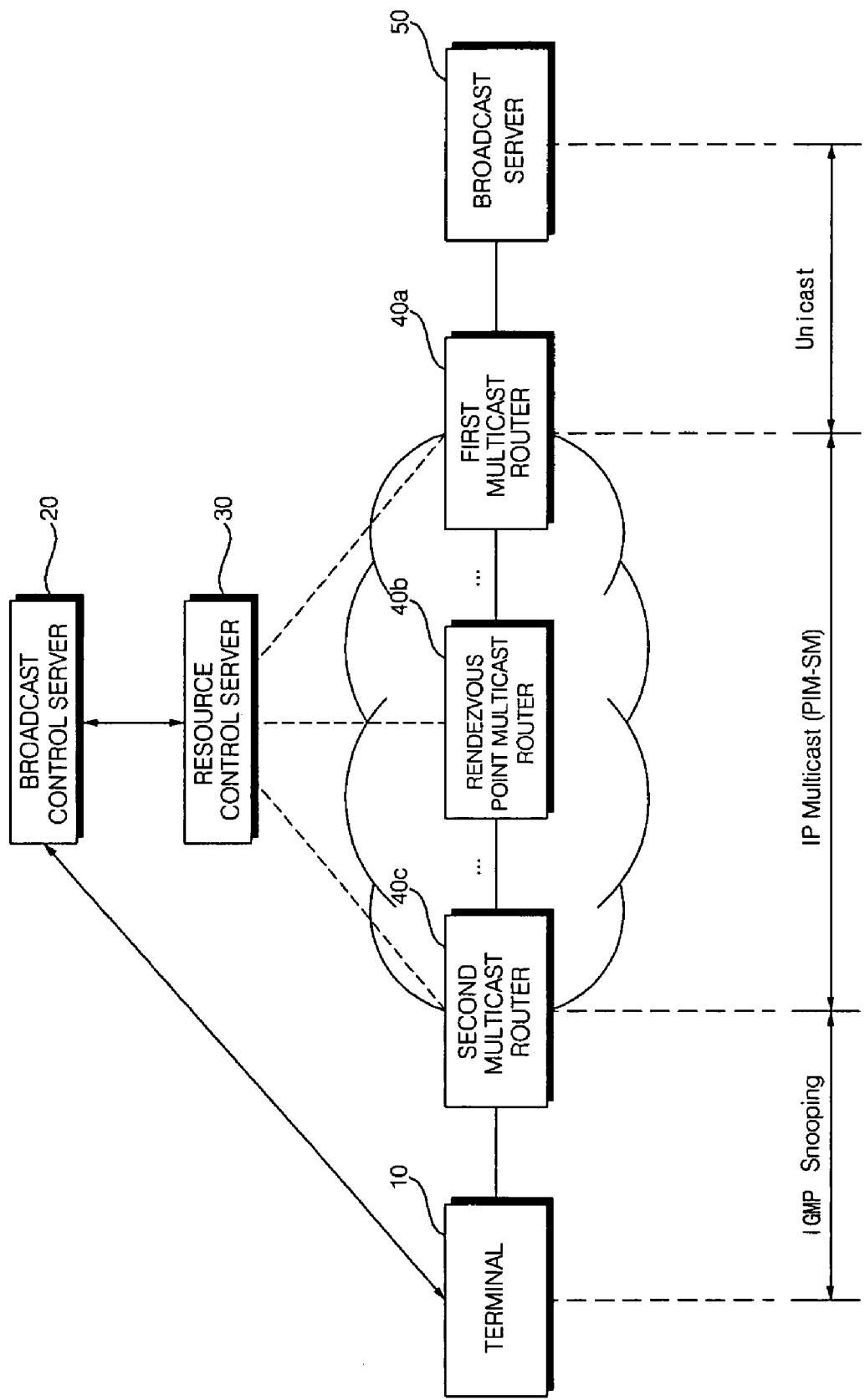
FIG. 2 illustrates a block diagram for explaining the transmission of a multicast packet by the system illustrated in FIG. 1.

The second multicast router 40c, which is disposed at the network termination near the terminal 10, may be equipped with a multicast group management protocol for managing a multicast group such as an Internet group management protocol (IGMP). The IGMP may be used to manage a group membership. That is, referring to FIG. 2, IP multicast packets may be transmitted through the multicast routers 40a, 40b and 40c configured by the PIM-SM protocol. On the other hand, IP multicast packets may be transmitted through the second multicast router 40c to the terminal 10 being managed by the IGMP.

The broadcast server 50 transmits a multimedia broadcast program. If the PIM-SM protocol is used, a broadcast program provided by the broadcast server 50 may be transmitted to the multicast router 40b even when the terminal 10 does not issue a request for a broadcast channel.

Figure 3:
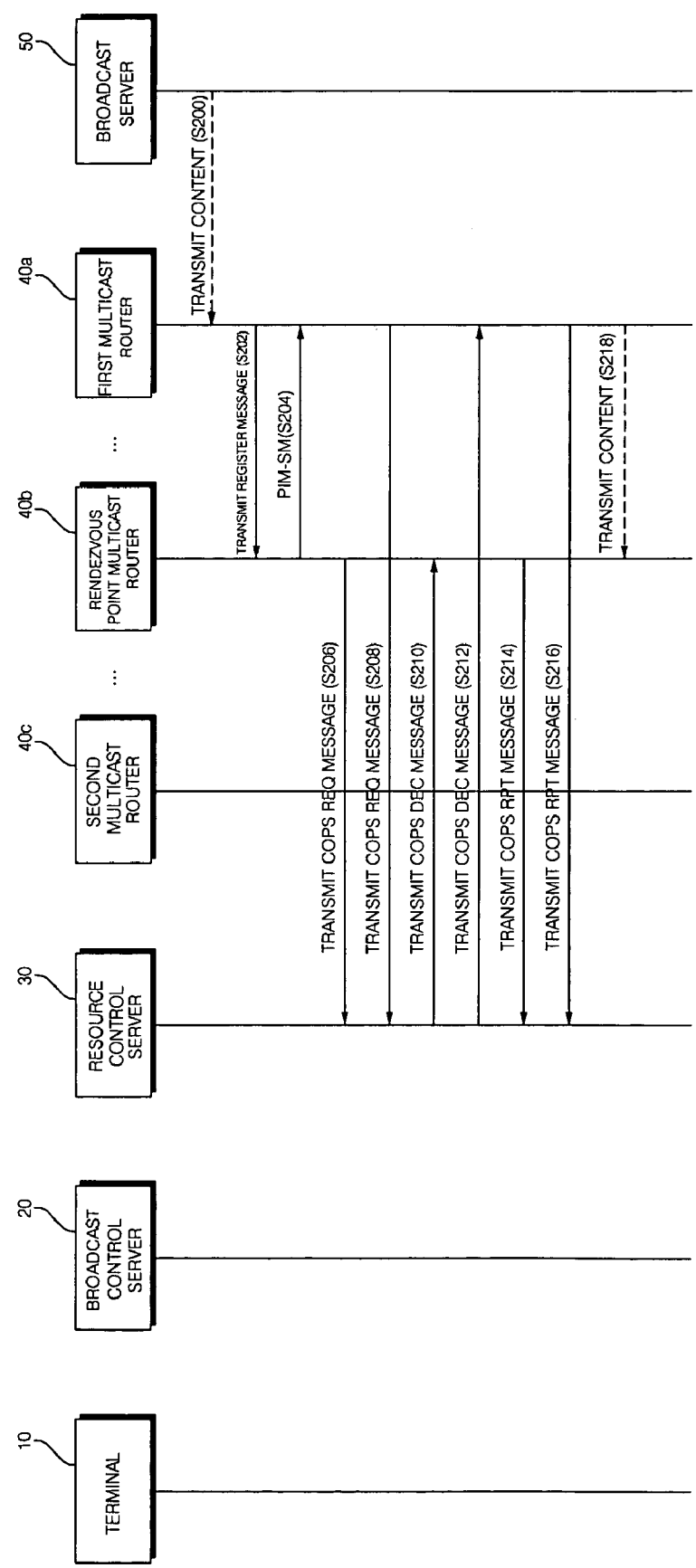
FIGS. 3 and 4 illustrate flowcharts of a method of providing a multicast service according to an embodiment of the present invention.
Figure 4:
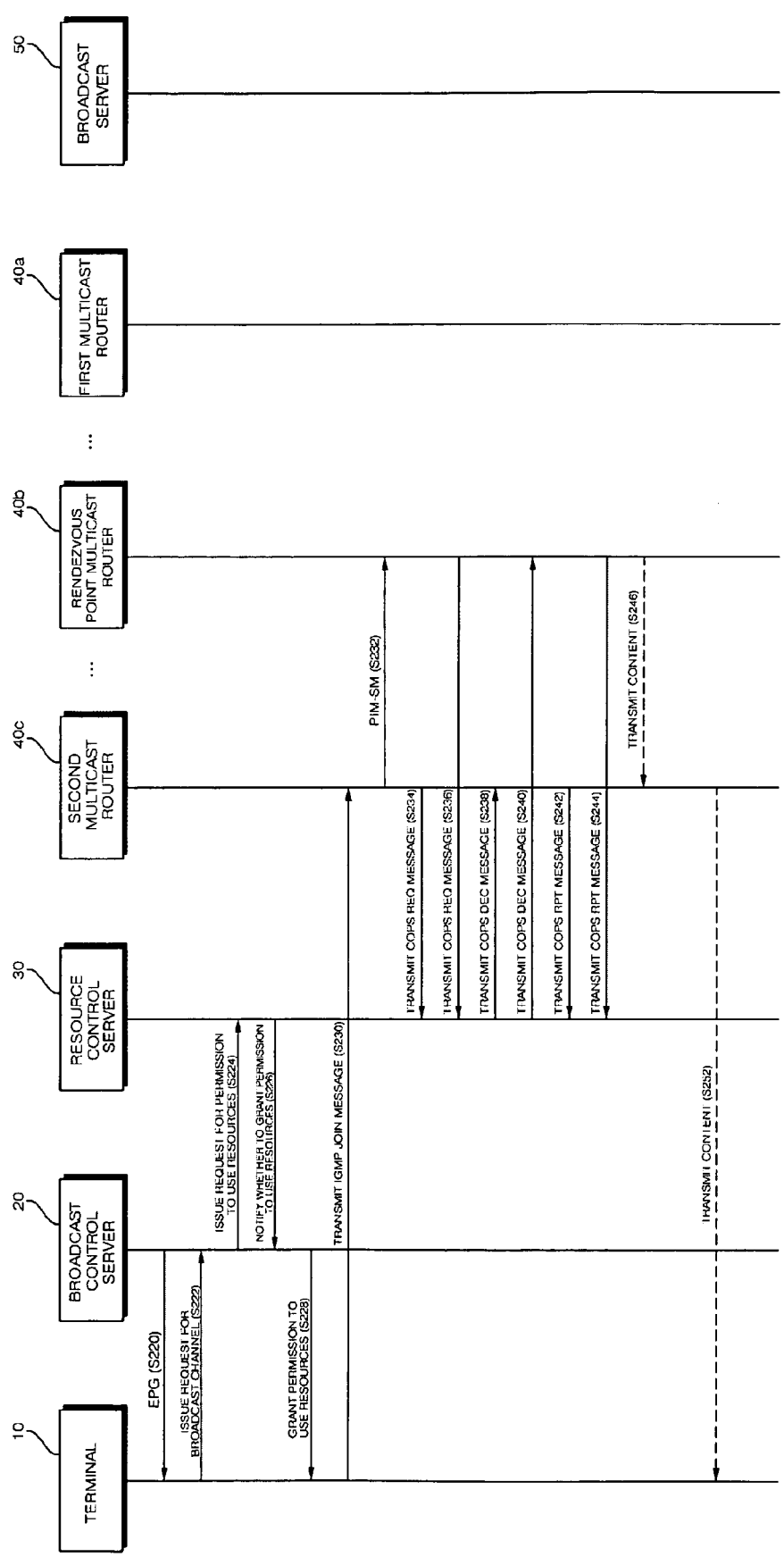

FIGS. 3 and 4 illustrate flowcharts of a method of providing a multicast service according to an embodiment of the present invention. Referring to FIG. 3, the broadcast server 50 transmits a broadcast program to the first multicast router 40a (S200). Thereafter, the first multicast router 40a transmits a REGISTER message to the rendezvous point multicast router 40b (S202). The multicast routers between the rendezvous point multicast router 40b and the first multicast router 40a calculated the first routing path using the PIM-SM protocol (S204).

Thereafter, a number of routers on the first routing path, i.e., the routers including the rendezvous point multicast router 40b and the first multicast router 40a, issue a request for resources to the resource control server 30 by transmitting a COPS request (REQ) message to the resource control server 30 (S206 and S208). Then, the resource control server 30 determines whether there are available resources and allocates resources to the routers including the rendezvous point multicast router 40b and the first multicast router 40a by transmitting a COPS decision (DEC) message to the routers including the rendezvous point multicast router 40b and the first multicast router 40a (S210 and S212). Thereafter, the router including the rendezvous point multicast router 40b and the first multicast router 40a transmit a COPS report state (RPT) message to the resource control server 30 (S214 and S216).

Then, a broadcast program provided by the broadcast server 50 is transmitted through the first routing path between the first multicast router 40a and the rendezvous point multicast router 40b (S218).

Referring to FIG. 4, the broadcast control server 20 transmits EPG information regarding a plurality of broadcast programs provided by the broadcast server 50 to the terminal 10 (S220). Then, the terminal 10 issues a request for a desired broadcast channel with reference to the EPG information (S222). The broadcast control server 20 issues a request for permission to use resources to the resource control server 30 by using an Rx/Gq AA-request (AAR) message (S224). Thereafter, the resource control server 30 notifies the broadcast control server 20 whether to grant permission to use resources by transmitting AA-answer (AAA) message (S226). Then, the broadcast control server 20 notifies the terminal 10 whether the resource control server 30 is to grant permission to use resources (S228).

If the terminal 10 is granted permission to use resources, the terminal 10 transmits an IGMP join message including the address of a multicast group for the desired broadcast channel to the second multicast router 40c (S230). A number of multicast routers including the second multicast router 40c calculate the second routing path between the second multicast router 40c and the rendezvous point multicast router 40b using the PIM-SM routing protocol (S232).

All multicast routers on the second routing path, i.e., the router including the second multicast router 40c and the rendezvous point multicast router 40b, issue a request for resources to the resource control server 30 by transmitting a COPS REQ message to the resource control server 30 (S234 and S236). If there is an existing multicast routing tree, a number of routers on a routing path from the second multicast router to the branch point router on the existing routing tree may issue a request for resources to the resource control server 30 by transmitting a COPS REQ message to the resource control server 30 (S234 and S236). Thereafter, the resource control server 30 determines whether there are available resources and allocates resources to the router including the second multicast router 40c and the rendezvous point multicast router 40b by transmitting a COPS DEC message (S238 and S240). Thereafter, the rendezvous point multicast router 40b and the first multicast router 40a transmit a COPS RPT message to the resource control server 30 (S242 and S244).

Then, a broadcast program provided by the broadcast server 50 is transmitted through the routing path between the second multicast router 40c and the rendezvous point multicast router 40b (S246), and the second multicast router 40c transmits the broadcast program to the terminal 10 (S252).

In this manner, it is possible to improve the QoS of broadcast services by enabling a multicast router to calculate each routing path and enabling the resource control server to perform centralized resource control.

The embodiment of FIGS. 3 and 4 has been described above on the assumption that there are three multicast routers. However, in reality, the number of multicast routers on a path for transmitting multicast packets is generally greater than 3. In this case, each multicast router on a path for transmitting multicast packets may calculate a routing path and may then issue a request for resources for the calculated routing path to the resource control server 30.

As described above, according to the present invention, it is possible to improve the QoS of broadcast services by separating a routing path calculation function and a resource allocation function, enabling the routing path calculation function and the resource allocation function to be performed by a multicast router and a resource control server, respectively, and enabling the resource control server to perform centralized resource control. The present invention can be applied not only to SIP-based NGNs but also to other NGNs that are not based on SIP because the interface between a terminal and a broadcast control server is not restricted to certain types of protocols.

The present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of providing a multicast service, the method comprising:
   calculating a first routing path between a first multicast router configured to communicate with a broadcast server and a rendezvous point multicast router by the multicast routers on the first routing path;
   receiving, by a resource control server, a request for resources from each of the routers on the first routing path;
   allocating, by the resource control server, resources to the routers on the first routing path;
   calculating a second routing path between a second multicast router configured to communicate with a terminal and the rendezvous point multicast router by the multicast routers on the second routing path;
   receiving, by the resource control server, a request for resources from each of the routers on the second routing path; and
   allocating, by the resource control server, resources to the routers on the second routing path.

2. The method of claim 1, further comprising receiving a multimedia broadcast program through a calculated routing path comprising the first and second calculated paths.

3. The method of claim 1, wherein the calculating the first routing path or the second routing path further comprises calculating the first routing path or the second routing path using a multicast routing protocol.

4. The method of claim 1, wherein, when there is an existing multicast routing tree, the calculating the second routing path further comprises enabling each of the routers on a path from the second multicast router to a branch point router on the existing multicast routing tree to issue a request for resources to the resource control server and to receive resources allocated from the resource control server.

5. The method of claim 1, further comprising:
   providing electronic program guide information by a broadcast control server to the terminal;
   receiving a request for a desired broadcast channel by the broadcast control server with reference to the electronic program guide (EPG) information provided to the terminal.

6. The method of claim 5, further comprising:
   issuing a request for permission to use resources from the broadcast control server to the resource control server; and
   transmitting from the broadcast control server a grant of permission to use resources to the terminal upon receiving a response message from the resource control server for the request issued by the broadcast control server for permission to use resources.

7. A system for providing a multicast service, the system comprising: at least one transmitter-side multicast router configured to communicate with a transmitter-side network termination and to issue a request for the calculation of a first routing path from the at least one transmitter-side multicast router to a rendezvous point multicast router;
   at least one terminal-side multicast router configured communicate with a terminal-side network termination and to trigger the calculating of the second routing path from the at least one terminal-side multicast router to the rendezvous point multicast router;
   a resource control server configured to receive a request for resources from each of the routers on the first routing path and each of the routers on the second routing path and to allocate resources to the routers on the first routing path and the routers on the second routing path in response to the requests from the routers on the first and second routing paths; and
   a broadcast control server configured to issue a request for permission to use resources to the resource control server upon receiving a request for a desired broadcast channel issued from a terminal and to notify the terminal whether the resource control server is to grant permission to use resources for the desired broadcast channel.

8. The system of claim 7, wherein the at least one transmitter-side multicast router is further configured to receive a broadcast program corresponding to the desired broadcast channel.

9. The system of claim 7, wherein the multicast routers including the transmitter-side multicast router and the terminal-side multicast router calculate the first and second routing paths, respectively, using a multicast routing protocol.

10. The system of claim 7, wherein the broadcast control server is configured to receive a response message from the resource control server and to notify the terminal whether the resource control server is to grant permission to use resources according to the received response message.

11. The system of claim 7, wherein the broadcast control server is configured to provide the terminal with electronic program guide information and the request for the desired broadcast channel is based on the electronic program guide information.

12. The system of claim 7, wherein the terminal-side multicast router manages a multicast group using a multicast group management protocol.

13. A method of providing a multicast service, the method comprising:
- receiving a broadcast program from a broadcast server at a first multicast router;
- calculating a first routing path between a rendezvous point multicast router and the first multicast router in response to the received broadcast program;
- after calculating the first routing path, issuing a request for resources from a number of routers on the first routing path, including the rendezvous point multicast router and the first multicast router, to a resource control server;
- determining by the resource control server whether there are available resources;
- allocating resources by the resource control server to the number of routers on the first routing path when it is determined there are available resources;
- transmitting the broadcast program provided by the broadcast server through the first routing path between the first multicast router and the rendezvous point multicast router;
- transmitting electronic program guide information regarding a plurality of broadcast programs provided by the broadcast server from the broadcast control server to a terminal;
- receiving a request for a desired broadcast channel with reference to the transmitted electronic program guide information by the broadcast control server from the terminal;
- issuing a request for permission to use resources from the broadcast control server to the resource control server in response to the request for the desired broadcast channel;
- transmitting an answer message from the resource control server to the broadcast control server whether to grant permission to use resources; and
- transmitting a notification from the broadcast control server to the terminal whether the resource control server is to grant permission to use resources.

14. The method of claim 13 further comprising:
- receiving a message including the address of a multicast group for the desired broadcast channel from the terminal by a second multicast router when permission is granted to use resources;
- calculating a second routing path between the second multicast router and the rendezvous point multicast router;
- transmitting a request for resources from each of the multicast routers on the second routing path, including the second multicast router and the rendezvous point multicast router, to the resource control server;
- determining by the resource control server whether there are available resources; and
- transmitting a message allocating resources from the resource control server to the multicast routers on the second routing path when resources are determined available.

15. The method of claim 14 further comprising transmitting the broadcast program provided by the broadcast server through the second routing path to the terminal.

* * * * *